(12) United States Patent
Nakajima et al.

(10) Patent No.: US 10,678,064 B2
(45) Date of Patent: Jun. 9, 2020

(54) VIDEO DISPLAY DEVICE

(71) Applicant: JVCKENWOOD Corporation, Yokohama-shi, Kanagawa (JP)

(72) Inventors: Nobuki Nakajima, Yokohama (JP); Takeshi Makabe, Yokohama (JP)

(73) Assignee: JVCKENWOOD CORPORATION, Yokohama-Shi, Kanagawa (JP)

( * ) Notice: Subject to any disclaimer, the term of this patent is extended or adjusted under 35 U.S.C. 154(b) by 0 days.

(21) Appl. No.: 16/522,329

(22) Filed: Jul. 25, 2019

(65) Prior Publication Data

US 2020/0033620 A1    Jan. 30, 2020

(30) Foreign Application Priority Data

Jul. 26, 2018 (JP) .................................. 2018-140070

(51) Int. Cl.
*G02B 30/25* (2020.01)
*H04N 13/139* (2018.01)
*H04N 13/167* (2018.01)
*G09G 3/36* (2006.01)

(52) U.S. Cl.
CPC ........... *G02B 30/25* (2020.01); *H04N 13/139* (2018.05); *H04N 13/167* (2018.05); *G09G 3/3648* (2013.01)

(58) Field of Classification Search
CPC ...................................... G02B 30/25
USPC ........................................... 348/51
See application file for complete search history.

(56) References Cited

U.S. PATENT DOCUMENTS

2006/0017667 A1*   1/2006   Seki ...................... G09G 3/3233
                                                                  345/76
2014/0078267 A1*   3/2014   Sato ...................... G09G 3/2059
                                                                  348/54

FOREIGN PATENT DOCUMENTS

JP           5605175 A       5/2012

* cited by examiner

*Primary Examiner* — Yulin Sun
(74) *Attorney, Agent, or Firm* — Nath, Goldberg & Meyer; Jerald L. Meyer

(57) ABSTRACT

A drive gradation table is configured as follows. The number of subframes turned to a drive state is increased each time drive gradations are increased. When all of the subframes are divided into a plurality of subframe groups including a plurality of continuous subframes, as gradations are increased, subframes turned to the drive state are increased in order from the latest subframe group to the earliest subframe group among the plurality of subframe groups. In each of the subframe groups, the subframes turned to the drive state are increased in order from the earlier subframe to the later subframe.

2 Claims, 12 Drawing Sheets

FIG. 5

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 1 | 0 | 0 | 0 |
| 2 | 0 | 0 | 0 | 0 | 0 | 0 | 0 | 0 | 1 | 1 | 0 | 0 |
| 3 | 0 | 0 | 0 | 0 | 0 | 0 | 0 | 0 | 1 | 1 | 1 | 0 |
| 4 | 0 | 0 | 0 | 0 | 0 | 0 | 0 | 0 | 1 | 1 | 1 | 1 |
| 5 | 0 | 0 | 0 | 0 | 1 | 0 | 0 | 0 | 1 | 1 | 1 | 1 |
| 6 | 0 | 0 | 0 | 0 | 1 | 1 | 0 | 0 | 1 | 1 | 1 | 1 |
| 7 | 0 | 0 | 0 | 0 | 1 | 1 | 1 | 0 | 1 | 1 | 1 | 1 |
| 8 | 0 | 0 | 0 | 0 | 1 | 1 | 1 | 1 | 1 | 1 | 1 | 1 |
| 9 | 1 | 0 | 0 | 0 | 1 | 1 | 1 | 1 | 1 | 1 | 1 | 1 |
| 10 | 1 | 1 | 0 | 0 | 1 | 1 | 1 | 1 | 1 | 1 | 1 | 1 |
| 11 | 1 | 1 | 1 | 0 | 1 | 1 | 1 | 1 | 1 | 1 | 1 | 1 |
| 12 | 1 | 1 | 1 | 1 | 1 | 1 | 1 | 1 | 1 | 1 | 1 | 1 |

1FRAME

| NAME OF REGION | LEFT(L) | RIGHT(R) | LEFT(L) | RIGHT(R) | LEFT(L) | RIGHT(R) |
|---|---|---|---|---|---|---|
| REGION 1 | H | H | H | H | H | H |
| REGION 2 | L | L | L | L | L | L |
| REGION 3 | L | H | L | H | L | H |
| REGION 3' | H | L | H | L | H | L |

3D DISPLAY
(OBSERVED IMAGES BY ONE EYE (LEFT EYE) WITH GLASSES)

FIG. 10A

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 1 | 0 | 0 | 0 | 0 | 0 | 0 | 0 | 0 | 0 | 0 | 0 |
| 2 | 1 | 1 | 0 | 0 | 0 | 0 | 0 | 0 | 0 | 0 | 0 | 0 |
| 3 | 1 | 1 | 1 | 0 | 0 | 0 | 0 | 0 | 0 | 0 | 0 | 0 |
| 4 | 1 | 1 | 1 | 1 | 0 | 0 | 0 | 0 | 0 | 0 | 0 | 0 |
| 5 | 1 | 1 | 1 | 1 | 1 | 0 | 0 | 0 | 0 | 0 | 0 | 0 |
| 6 | 1 | 1 | 1 | 1 | 1 | 1 | 0 | 0 | 0 | 0 | 0 | 0 |
| 7 | 1 | 1 | 1 | 1 | 1 | 1 | 1 | 0 | 0 | 0 | 0 | 0 |
| 8 | 1 | 1 | 1 | 1 | 1 | 1 | 1 | 1 | 0 | 0 | 0 | 0 |
| 9 | 1 | 1 | 1 | 1 | 1 | 1 | 1 | 1 | 1 | 0 | 0 | 0 |
| 10 | 1 | 1 | 1 | 1 | 1 | 1 | 1 | 1 | 1 | 1 | 0 | 0 |
| 11 | 1 | 1 | 1 | 1 | 1 | 1 | 1 | 1 | 1 | 1 | 1 | 0 |
| 12 | 1 | 1 | 1 | 1 | 1 | 1 | 1 | 1 | 1 | 1 | 1 | 1 |

1FRAME

FIG. 10B

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 1 |
| 2 | 0 | 0 | 0 | 0 | 0 | 0 | 0 | 0 | 0 | 0 | 1 | 1 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 0 | 0 | 1 | 1 | 1 | 1 | 1 | 1 | 1 | 1 | 1 | 1 |
| 11 | 0 | 1 | 1 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

1FRAME

FIG. 13A

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 1 | 0 | 0 | 0 | 0 | 0 |
| 2 | 0 | 0 | 0 | 0 | 0 | 0 | 1 | 1 | 0 | 0 | 0 | 0 |
| 3 | 0 | 0 | 0 | 0 | 0 | 0 | 1 | 1 | 1 | 0 | 0 | 0 |
| 4 | 0 | 0 | 0 | 0 | 0 | 0 | 1 | 1 | 1 | 1 | 0 | 0 |
| 5 | 0 | 0 | 0 | 0 | 0 | 0 | 1 | 1 | 1 | 1 | 1 | 0 |
| 6 | 0 | 0 | 0 | 0 | 0 | 0 | 1 | 1 | 1 | 1 | 1 | 1 |
| 7 | 1 | 0 | 0 | 0 | 0 | 0 | 1 | 1 | 1 | 1 | 1 | 1 |
| 8 | 1 | 1 | 0 | 0 | 0 | 0 | 1 | 1 | 1 | 1 | 1 | 1 |
| 9 | 1 | 1 | 1 | 0 | 0 | 0 | 1 | 1 | 1 | 1 | 1 | 1 |
| 10 | 1 | 1 | 1 | 1 | 0 | 0 | 1 | 1 | 1 | 1 | 1 | 1 |
| 11 | 1 | 1 | 1 | 1 | 1 | 0 | 1 | 1 | 1 | 1 | 1 | 1 |
| 12 | 1 | 1 | 1 | 1 | 1 | 1 | 1 | 1 | 1 | 1 | 1 | 1 |

1FRAME

FIG. 13B

| GRADATION | SF1 | SF2 | SF3 | SF4 | SF5 | SF6 | SF7 | SF8 | SF9 | SF10 | SF11 | SF12 |
|---|---|---|---|---|---|---|---|---|---|---|---|---|
| 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 1 | 0 | 0 |
| 2 | 0 | 0 | 0 | 0 | 0 | 0 | 0 | 0 | 0 | 1 | 1 | 0 |
| 3 | 0 | 0 | 0 | 0 | 0 | 0 | 0 | 0 | 0 | 1 | 1 | 1 |
| 4 | 0 | 0 | 0 | 0 | 0 | 0 | 0 | 0 | 1 | 1 | 1 | 1 |
| 5 | 0 | 0 | 0 | 0 | 0 | 0 | 0 | 1 | 1 | 1 | 1 | 1 |
| 6 | 0 | 0 | 0 | 0 | 0 | 0 | 1 | 1 | 1 | 1 | 1 | 1 |
| 7 | 0 | 0 | 0 | 0 | 0 | 1 | 1 | 1 | 1 | 1 | 1 | 1 |
| 8 | 0 | 0 | 0 | 0 | 1 | 1 | 1 | 1 | 1 | 1 | 1 | 1 |
| 9 | 0 | 0 | 0 | 1 | 1 | 1 | 1 | 1 | 1 | 1 | 1 | 1 |
| 10 | 1 | 0 | 0 | 1 | 1 | 1 | 1 | 1 | 1 | 1 | 1 | 1 |
| 11 | 1 | 1 | 0 | 1 | 1 | 1 | 1 | 1 | 1 | 1 | 1 | 1 |
| 12 | 1 | 1 | 1 | 1 | 1 | 1 | 1 | 1 | 1 | 1 | 1 | 1 |

1FRAME

VIDEO DISPLAY DEVICE

CROSS REFERENCE TO RELATED APPLICATION

This application is based upon and claims the benefit of priority under 35 U.S.C. § 119 from Japanese Patent Application No. 2018-140070 filed on Jul. 26, 2018, the entire contents of which are incorporated herein by reference.

BACKGROUND

The present disclosure relates to a video display device.

In the case of a video display device that alternately displays temporally discontinuous videos, such as a stereoscopic video display projector that alternately displays a left-eye video signal and a right-eye video signal, it is important to reduce an influence (hereinafter, referred to as crosstalk) caused by mutual video signals. Japanese Patent No. 5605175 describes technology for reducing crosstalk in the stereoscopic video display projector.

SUMMARY

The projector that alternately displays the temporally discontinuous videos is not limited to the stereoscopic video display projector, and for example, such a projector is also put into practical use, which alternately displays a visible light video and an infrared light video and causes a person who views a video by the naked eye and a person who views a video while putting on night vision goggles to view different videos. From such a background, reduction of crosstalk has further been attracting attention as an important factor to improve the image quality.

Moreover, as a resolution of a display element has increased, an image displayed on the video display device has become clearer, whereby minute degradation of an image quality has been apt to be conspicuous. Therefore, the video display device is required to further improve the image quality.

A first aspect of one or more embodiments provides a video display device including: a subframe data generator configured to convert video data with N+1 gradations into subframe data with N bits based on a drive gradation table, where N is a natural number; a display element; and a drive circuit configured to drive the display element based on the subframe data, wherein the drive gradation table is configured such that a number of subframes turned to a drive state is increased each time drive gradations are increased, when all the subframes are divided into a plurality of subframe groups including a plurality of continuous subframes, as gradations are increased, subframes turned to the drive state are increased in order from a latest subframe group to an earliest subframe group among the plurality of subframe groups, and in each of the subframe groups, the subframes turned to the drive state are increased in order from the earlier subframe to the later subframe.

A second aspect of one or more embodiments provides a video display method including: converting video data with N+1 gradations into subframe data with N bits based on a drive gradation table, where N is a natural number; and driving a display element based on the subframe data, wherein the drive gradation table is configured such that a number of subframes turned to a drive state is increased each time drive gradations are increased, when all of the subframes are divided into a plurality of subframe groups including a plurality of continuous subframes, as gradations are increased, subframes turned to the drive state are increased in order from a latest subframe group to an earliest subframe group among the plurality of subframe groups, and in each of the subframe groups, the subframes turned to the drive state are increased in order from the earlier subframe to the later subframe.

BRIEF DESCRIPTION OF THE DRAWINGS

FIG. 5 is a table illustrating an example of a drive gradation table for use in one or more embodiments.

FIG. 10A and FIG. 10B are views illustrating comparative examples of a subframe table.

FIG. 13A and FIG. 13B are views illustrating other examples of the drive gradation table.

DETAILED DESCRIPTION

Figure 1:
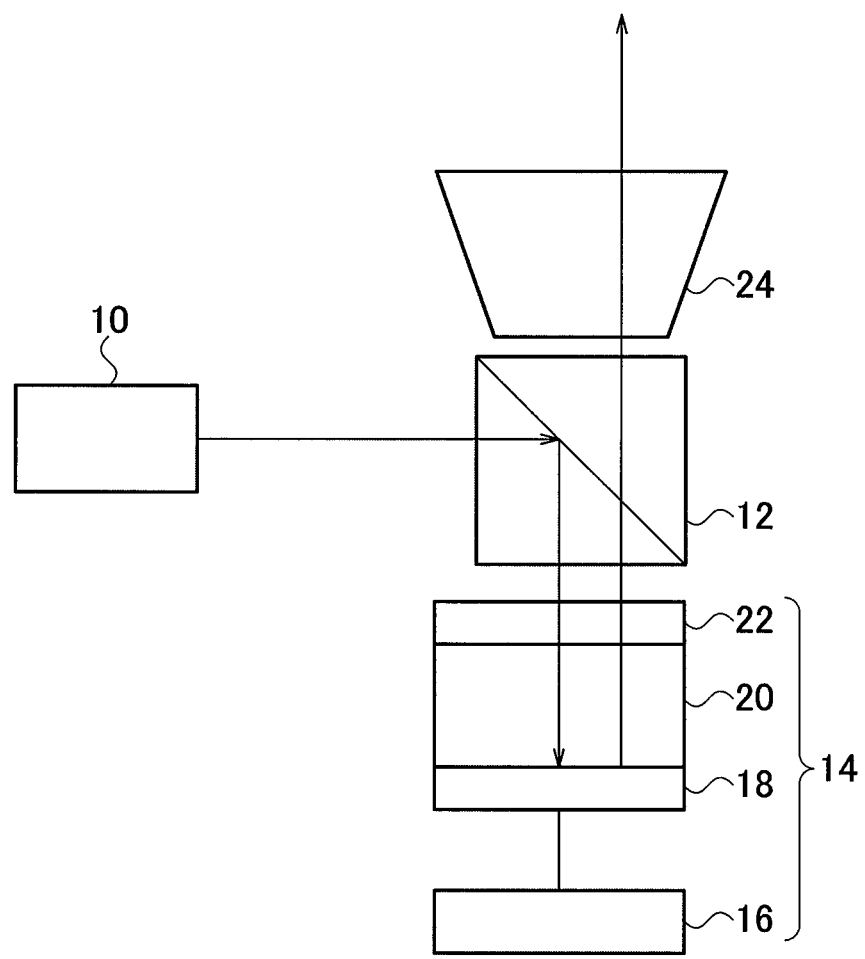
FIG. 1 is a diagram illustrating a schematic configuration of a video display device according to one or more embodiments.

A description will be given below of a video display device according to one or more embodiments with reference to the accompanying drawings. FIG. 1 illustrates a schematic configuration of the video display device according to one or more embodiments. Hereinbelow, a projection-type video display device provided with a reflection-type liquid crystal display element of an active matrix type as a display panel will be described as an example. Note that the video display device according to one or more embodiments can be applied not only to a liquid crystal display device (LCD), but also to a panel-type display device such as a plasma display panel (PDP) and a digital light processing (DLP).

A video display device 100 is composed by including an illumination optical system 10, a polarization beam splitter 12 (hereinafter, referred to as PBS 12), a liquid crystal display element 14, and a projection lens 24. The liquid crystal display element 14 is composed of m×n pixels arranged in a matrix of m rows and n columns. m and n are natural numbers, and for example, m is equal to 3,840, and n is equal to 2,160. The liquid crystal display element 14 has a structure in which a liquid crystal 20 is sealed between a counter electrode 22 and a pixel electrode 18. A pixel circuit 16 applies a voltage to a pixel electrode 18 of each pixel. In one or more embodiments, a description is given of an example of using the reflection-type liquid crystal display element; however, it is also possible to configure the video display device 100 by using a transmission-type liquid crystal display element as well as the reflection-type liquid crystal display element.

Illumination light emitted from the illumination optical system 10 enters the PBS 12. The PBS 12 has properties of reflecting one of s-polarized light and p-polarized light and transmitting the other thereof. In one or more embodiments, the PBS 12 is configured to reflect the s-polarized light and transmit the p-polarized light. Such an s-polarized light component of the illumination light reflects on the PBS 12, and enters the liquid crystal display element 14. Such a p-polarized light component of the illumination light transmits through the PBS 12, and is no longer used as illumination light. The illumination optical system 10 may be configured to integrate polarization states of the illumination light to the s-polarized light by a known method.

The liquid crystal 20 of the liquid crystal display element 14 modulates the received s-polarized light in response to the voltage applied between the pixel electrode 18 and the counter electrode 22 by the pixel circuit 16. The s-polarized light that enters the counter electrode 22 is modulated in a process of being reflected by the pixel electrode 18 and emitted from the counter electrode 22, and is emitted as light, which is composed of the p-polarized light and the s-polarized light, from the counter electrode 22. With regard to the light emitted from the counter electrode 22, only the p-polarized light component as the modulated light passes through the PBS 12, and the s-polarized light component is reflected by the PBS 12. The p-polarized light that passes through the PBS 12 is emitted by the projection lens 24, and is projected onto a screen (not illustrated), and an image is displayed thereon.

Figure 2:
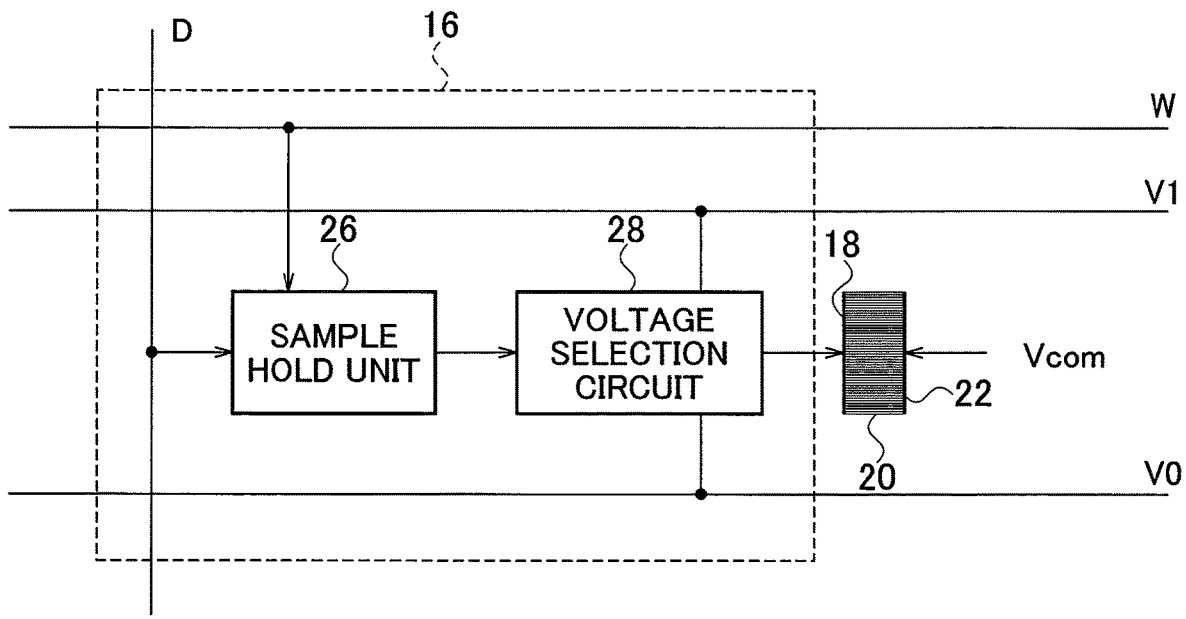
FIG. 2 is a diagram illustrating a configuration of a pixel circuit in a liquid crystal display element.

FIG. 2 illustrates a configuration of the pixel circuit 16 in the liquid crystal display element 14. Each of the pixels in the liquid crystal display element 14 has a structure in which the liquid crystal 20 is sandwiched between the pixel electrode 18 and the counter electrode 22. The pixel circuit 16 illustrated by a broken line includes a sample hold unit 26 and a voltage selection circuit 28. The sample hold unit 26 is composed of a flip-flop with an SRAM structure. The sample hold unit 26 is connected to a column data line D and a row selection line W. The output of the sample hold unit 26 is connected to the voltage selection circuit 28. The voltage selection circuit 28 is connected to a blanking voltage line V0 and a drive voltage line V1. The voltage selection circuit 28 is connected to the pixel electrode 18, and applies a predetermined voltage to the pixel electrode 18. The value of a voltage of the counter electrode 22 is referred to as a common voltage Vcom.

Figure 3:
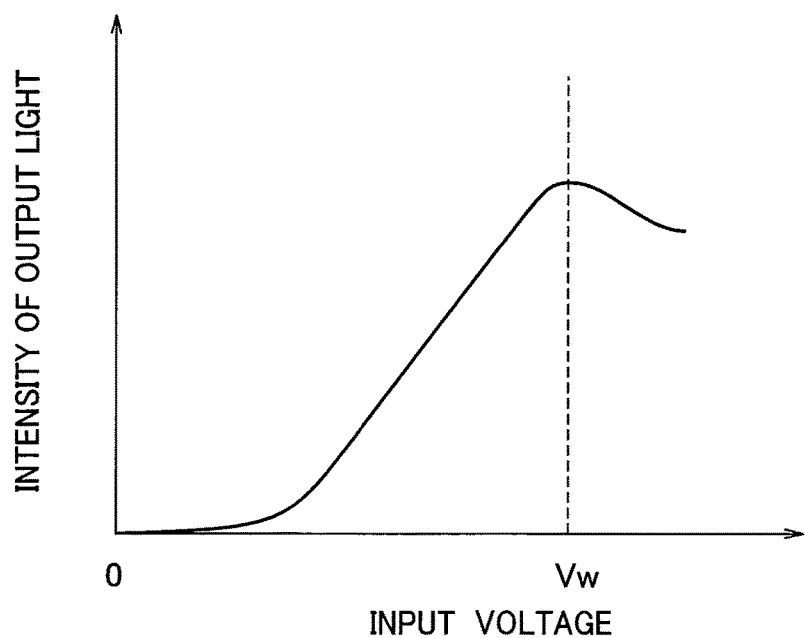
FIG. 3 is a graph illustrating a relationship between an input voltage and an intensity of output light in the liquid crystal display element.

FIG. 3 illustrates a relationship between an input voltage and an intensity of output light in the liquid crystal display element 14. In FIG. 3, an axis of abscissas thereof indicates the input voltage, which is a potential difference between the pixel electrode 18 and the counter electrode 22, that is, a drive voltage of the liquid crystal 20. An axis of ordinates indicates the intensity of the output light emitted from the liquid crystal 20. When the drive voltage is 0 (for example, both of the pixel electrode and the counter electrode 22 are at the ground), the intensity of the output light is small, and the display is in a black state. As the drive voltage is raised, the intensity of the output light is increased. A drive voltage when the intensity of the output light becomes maximum is referred to as a saturation voltage Vw.

Figure 4:
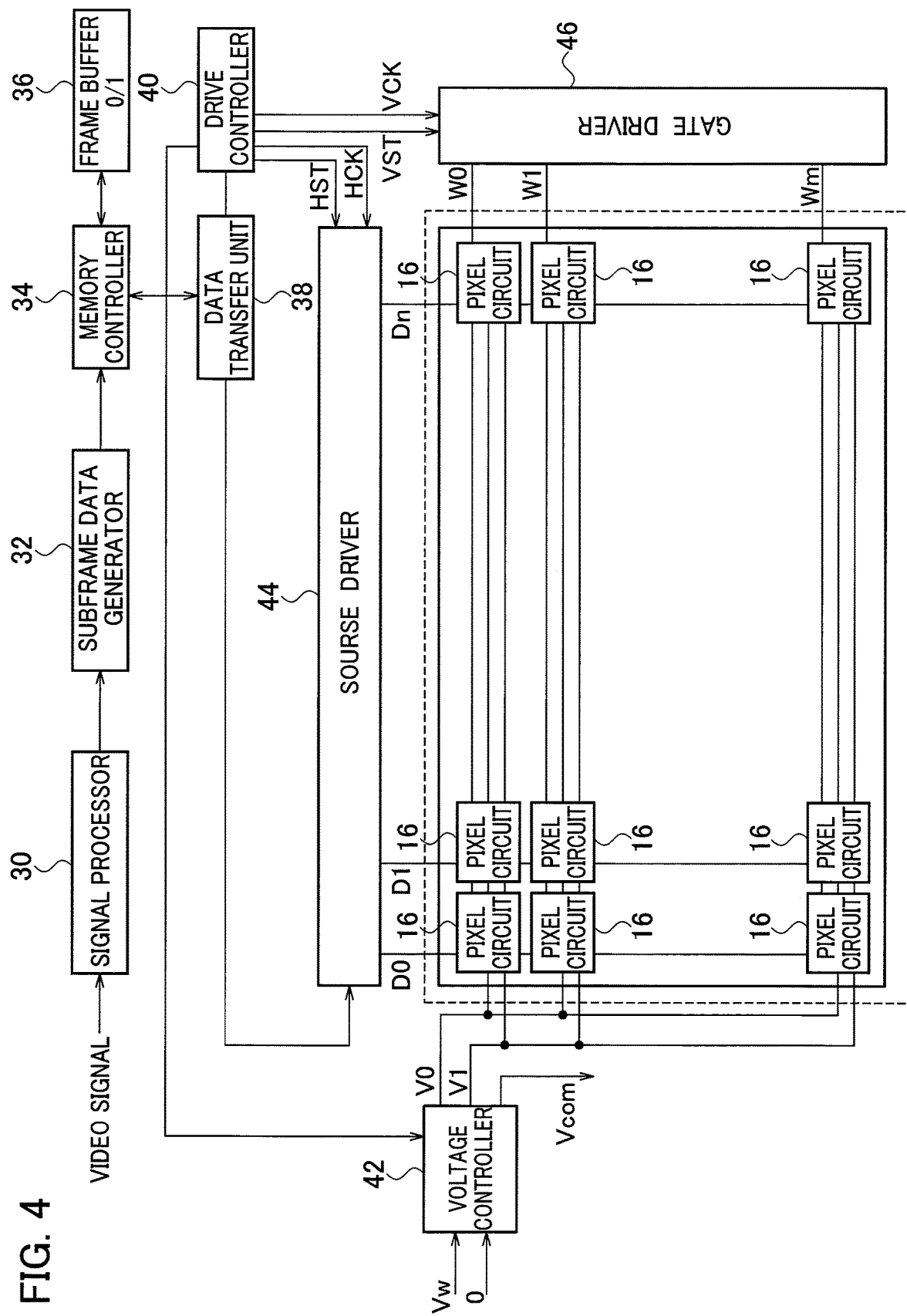
FIG. 4 is a block diagram illustrating a configuration example of a drive circuit.

Next, a drive circuit that drives the pixel circuit 16 will be described. FIG. 4 is a block diagram illustrating a configuration example of the drive circuit. A drive circuit 102 is composed by including a signal processor 30, a subframe data generator 32, a memory controller 34, a frame buffer 36, a data transfer unit 38, a drive controller 40, a voltage controller 42, a source driver 44, and a gate driver 46. The drive circuit 102 drives the respective pixel circuits 16 of the liquid crystal display element 14, which are arranged in the matrix of m rows and n columns.

The signal processor 30 performs arithmetic operations between peripheral pixels and between frames for an input video signal, thereby generating video data with N+1 (N is a natural number) gradations, and sends the generated video data to the subframe data generator 32. The subframe data generator 32 is composed by including a non-transitory storage medium, and based on a drive gradation table stored therein, converts the video data with the N+1 gradation into subframe data made of 1 and 0. The signal processor 30 and the subframe data generator 32 may be composed of hardware, or may be composed of software. Choice of the hardware and the software is arbitrary, and both of them may be mixed.

In one or more embodiments, one frame is divided into N subframes, and a voltage applied between the pixel electrode 18 and the counter electrode 22 in the liquid crystal display element 14 in each subframe period is switched on and off, whereby the gradation is displayed. Note that the subframes are denoted by SF1, SF2 . . . and SFN in order from a temporally earlier one. One or more embodiments will be described by taking the case of N=12 as an example. Note that the value of N is not limited to 12, and is settable to various values. For example, the value of N may be 32 or 64.

FIG. 5 illustrates an example of a drive gradation table for use in one or more embodiments. The vertical columns of the drive gradation table indicate the gradations, and the subframe data is generated based on the values in the drive gradation table, which correspond to the gradations of the video data.

As illustrated in FIG. 5, in the drive gradation table, one frame is divided into three subframe groups (SF1 to SF4, SF5 to SF8, and SF9 to SF12), each of which includes temporally continuous four subframes. In the first gradation, the earliest subframe (SF9) among the latest subframe group (SF9 to SF12) is turned to a drive state, and the number of subframes turned to the drive state is increased such that the subframes turned to the drive state extend temporally backward each time the gradations are increased. Moreover, when such drive gradations are further increased in a state where all the subframes included in the subframe group are turned to the drive state, then the earliest subframe in the next earliest subframe group is turned to the drive state.

Specifically, when the drive gradations are further increased in a state where all the subframes included in the subframe group composed of SF9 to SF12 are turned to the drive state, SF5 as the earliest subframe in the subframe group composed of SF5 to SF8 is turned to the drive state. Likewise, when the drive gradations are further increased in a state where all the subframes included in the subframe group composed of SF5 to SF8 are turned to the drive state, SF1 as the earliest subframe in the subframe group composed of SF1 to SF4 is turned to the drive state.

Returning to FIG. 4, the subframe data output from the subframe data generator 32 is stored by the memory controller 34 in a frame buffer 36 divided for each of the subframes. The frame buffer 36 has a double buffer structure with the frame buffers 0 and 1. During a period while data is stored in the frame buffer 0, data of the frame buffer 1 is transferred to the liquid crystal display element 14 via the data transfer unit 38. In the next frame, the data of the frame buffer 0 stored in the period of the previous frame is transferred to the liquid crystal display element 14 via the data transfer unit 38, and output data of the input video signal data, which is sent from the subframe data generator 32, is stored in the frame buffer 1.

The drive controller 40 controls timing of processing and the like for each of the subframes based on a horizontal start signal HST and a horizontal clock signal HCK. The drive controller 40 issues a transfer instruction to the data transfer unit 38, and controls the gate driver 46. In accordance with the instruction sent from the drive controller 40, the data transfer unit 38 issues an instruction to the memory controller 34, receives data of the designated subframe from the memory controller 34, and transfers the received data to the source driver 44.

Each time when receiving data for one line from the data transfer unit 38, the source driver 44 simultaneously transfers the received data to the corresponding pixel circuits 16 of the liquid crystal display element 14 by using the column data lines D0 to Dn. At this time, the gate driver 46 activates a row selection line Wy of a row y designated by a vertical start signal (VST) and a vertical shift clock signal (VCK), which are sent from the drive controller 40, and transfers the data to the pixel circuits 16 of the pixels in all of the columns of the designated row y.

The pixel circuit 16 turns on and off the applied voltage between the pixel electrode 18 and the counter electrode 22 in the liquid crystal display element 14 based on subframe data. 0 in the subframe data corresponds to off (voltage 0) of the applied voltage, and 1 in the subframe data corresponds to on (voltage Vw) of the applied voltage.

A description will be given below of an effect of using the subframe table according to one or more embodiments in comparison with the case of using the other subframe tables.

Comparison of Crosstalk

Figure 6:
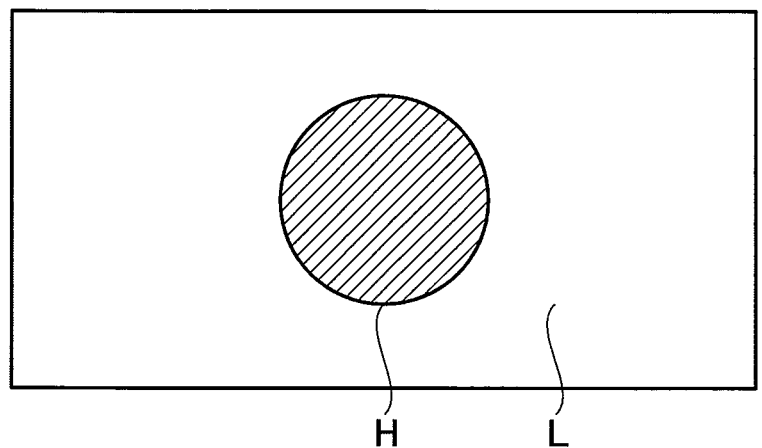
FIG. 6 is a two-dimensional view illustrating an image in which a circular region with a high gradation is present in a low gradation.

First, the crosstalk will be described by taking as an example the case of displaying a stereoscopic image. FIG. 6 illustrates a state where an image in which a circular region with a high gradation (H) is present in a low gradation (L) is two-dimensionally (2D) displayed.

Figure 7:
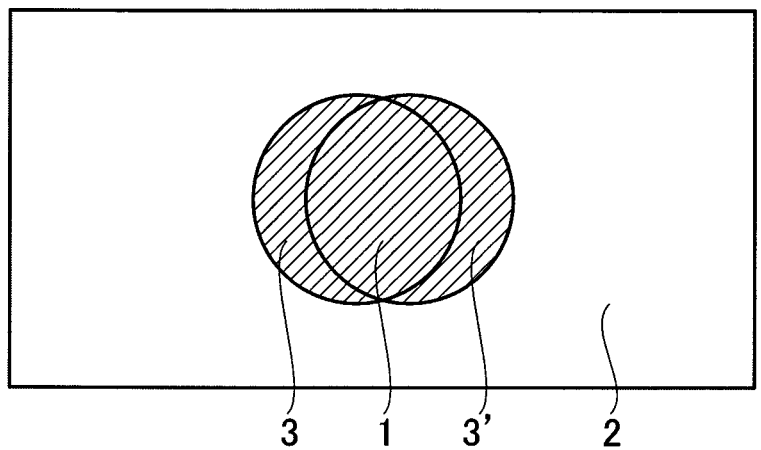
FIG. 7 is a view illustrating a state where the image shown in FIG. 6 is stereoscopically displayed by a stereoscopic video display device and the stereoscopically displayed image is observed by both eyes without liquid crystal shutter glasses attached thereto.
Figures 8, 9:
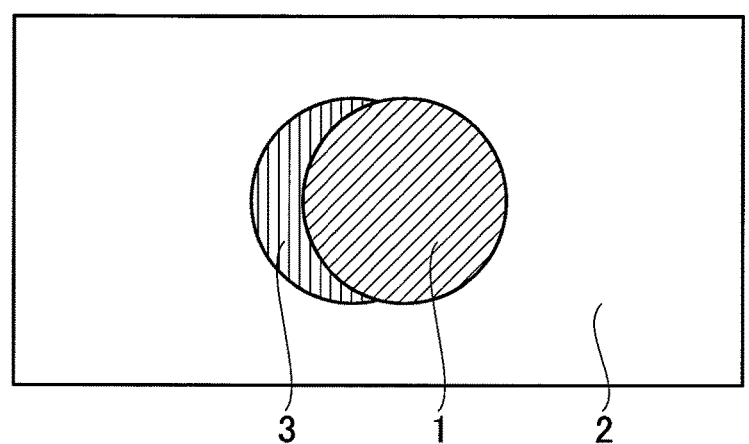
FIG. 8 is a view illustrating time changes of on-screen gradations in region 1, region 2, region 3, and region 3', which are illustrated in FIG. 7.
FIG. 9 is a view illustrating a state where the image shown in FIG. 6 is stereoscopically displayed by the stereoscopic video display device and the stereoscopically displayed image is observed by the left eye with the liquid crystal shutter glasses attached thereto.

FIG. 7 illustrates an image projected onto the screen when the image of FIG. 6 is stereoscopically displayed (3D-displayed) by a stereoscopic video display device. FIG. 7 illustrates a state where a 3D image is observed by both eyes without liquid crystal shutter glasses attached thereto. As illustrated in FIG. 7, a right-eye image and a left-eye image are displayed on the screen alternately in time. FIG. 8 illustrates time changes of on-screen gradations in the region 1, the region 2, the region 3, and the region 3', which are illustrated in FIG. 7. As illustrated in FIG. 8, a gradation H and a gradation L are continuously displayed respectively on the region 1 and the region 2, and meanwhile, the gradation H and the gradation L are displayed alternately in time in the region 3 and the region 3'.

FIG. 9 illustrates a state where the image of FIG. 6 is stereoscopically displayed by the stereoscopic video display device and the 3D image is observed by the left eye with the liquid crystal shutter glasses attached thereto. As illustrated in FIG. 9, the image looks like having the gradation H in the region 1, and looks like having the gradation L in the region 2. The region 3 must look like having the gradation L. However, the region 3 may sometimes be displayed at a higher gradation than the gradation L since the gradation of the previous frame (the right-eye frame) is H. In such a case, since the gradation of the region 3 approaches the gradation (the gradation H) of the right-eye image, the region 3 is recognized to cause crosstalk by an observer.

Hereinafter, an occurrence degree of the crosstalk will be compared between the case of using the subframe table of one or more embodiments and the case of using a subframe table of comparative examples. FIGS. 10A and 10B illustrate the comparative examples of the subframe table. The subframe table of FIG. 10A is defined as Comparative example 1, and the subframe table of FIG. 10B is defined as Comparative example 2. In the subframe table of FIG. 10A, only SF1 as the first subframe at the time of Gradation 1 is turned to the drive state, and as the gradation is increased, the subframes turned to the drive state are increased temporally backward. In the subframe table of FIG. 10B, only SF12 as the last subframe at the time of Gradation 1 is turned to the drive state, and as the gradation is increased, the subframes turned to the drive state are increased temporally forward.

Figure 11:
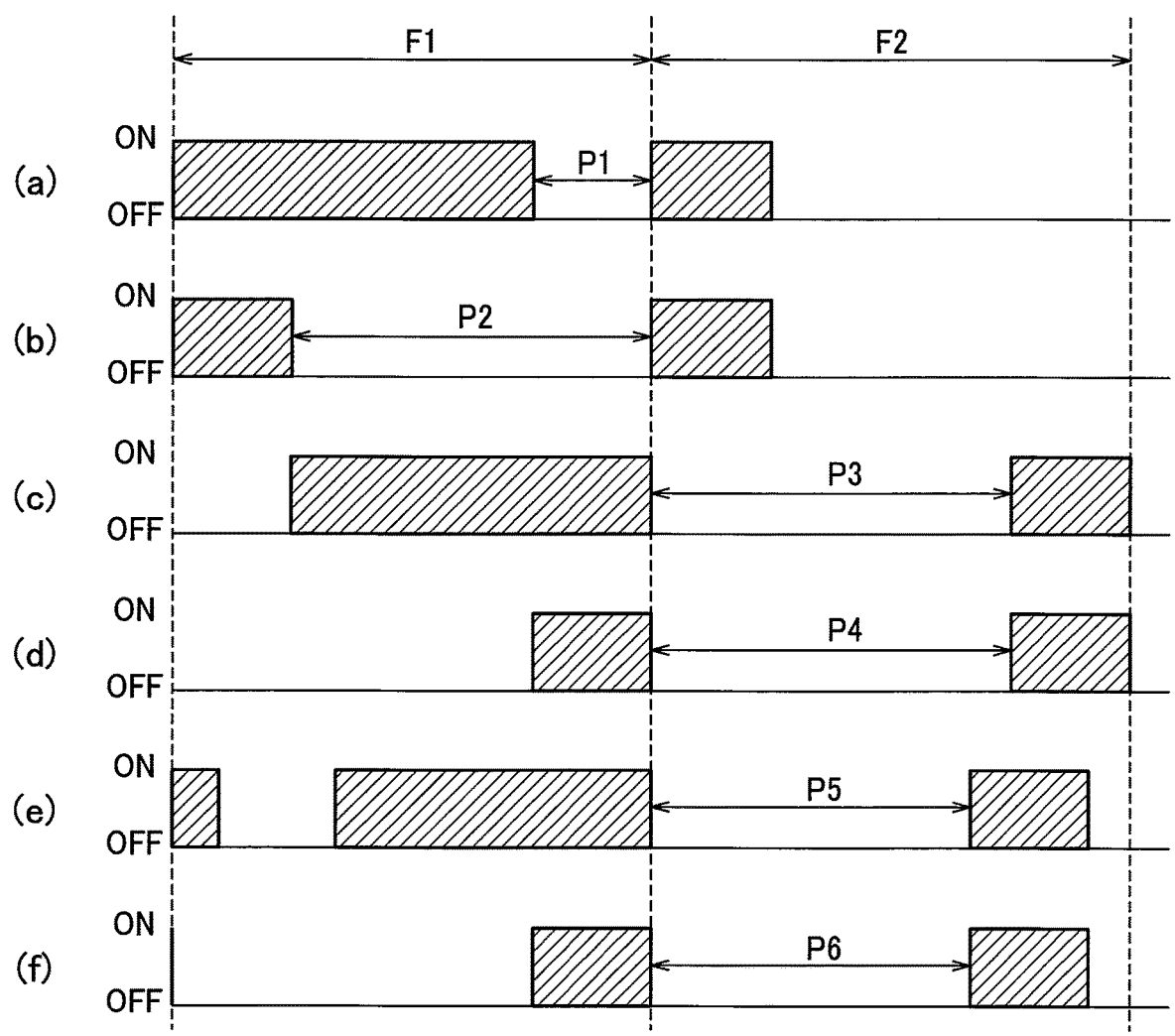
FIG. 11 is a view comparing subframe data in two continuous frames.

FIG. 11 is a view comparing subframe data in two continuous frames F1 and F2. An axis of abscissas in FIG. 11 indicates a lapse of time, and an axis of ordinates therein indicates the ON/OFF states of the applied voltage to the display element 14.

In FIG. 11, (a) and (b) illustrate the case of using the drive gradation table of Comparative example 1: (a) illustrates the case where the frame F1 is at the high gradation; and (b) illustrates the case where the frame F1 is at the low gradation. It is seen that a blanking period P1 after the display of the frame F1 until the display of the frame F2 when the frame F1 is at the high gradation and a blanking period P2 after the display of the frame F1 until the display of the frame F2 when the frame F1 is at the low gradation differ greatly from each other. By the fact that the blanking periods before the display of the frame F2 differ from each other, the frames F2 also differ in luminance. Specifically, when the blanking period before the display of the frame F2 is shorter, an influence of the frame F1 to the frame F2 is larger, and the luminance in the frame F2 is increased. Hence, in the case of using the drive gradation table of Comparative example 1, the fact that a gradation of a frame before an arbitrary frame is different from that of the arbitrary frame affects a luminance level of the frame, and this difference appears as crosstalk.

In FIG. 11, (c) and (d) illustrate the case of using the drive gradation table of Comparative example 2: (c) illustrates the case where the frame F1 is at the high gradation; and (d) illustrates the case where the frame F1 is at the low gradation. A blanking period P3 after the display of the frame F1 until the display of the frame F2 when the frame F1 is at the high gradation and a blanking period P4 after the display of the frame F1 until the display of the frame F2 when the frame F1 is at the low gradation are an identical time. Hence, the blanking period before the display of the frame F2 becomes constant regardless of the gradation of the previous frame, and accordingly, the occurrence of crosstalk can be suppressed in comparison with Comparative example 1.

In FIG. 11, (e) and (f) illustrate the case of using the drive gradation table of one or more embodiments: (e) illustrates the case where the frame F1 is at the high gradation; and (f)

illustrates the case where the frame F1 is at the low gradation. A blanking period P5 after the display of the frame F1 until the display of the frame F2 when the frame F1 is at the high gradation and a blanking period P6 after the display of the frame F1 until the display of the frame F2 when the frame F1 is at the low gradation are an identical time. Hence, the blanking period before the display of the frame F2 becomes constant regardless of the gradation of the previous frame, and accordingly, the occurrence of crosstalk can be suppressed in comparison with Comparative example 1 in a similar way to Comparative example 2.

That is, the crosstalk can be suppressed in the case of using the drive gradation tables in Comparative example 2 and one or more embodiments in comparison with the case of using the drive gradation table in Comparative example 1.

Comparison of Disclination

Next, a comparison will be made for an occurrence of disclination.

Figure 12:
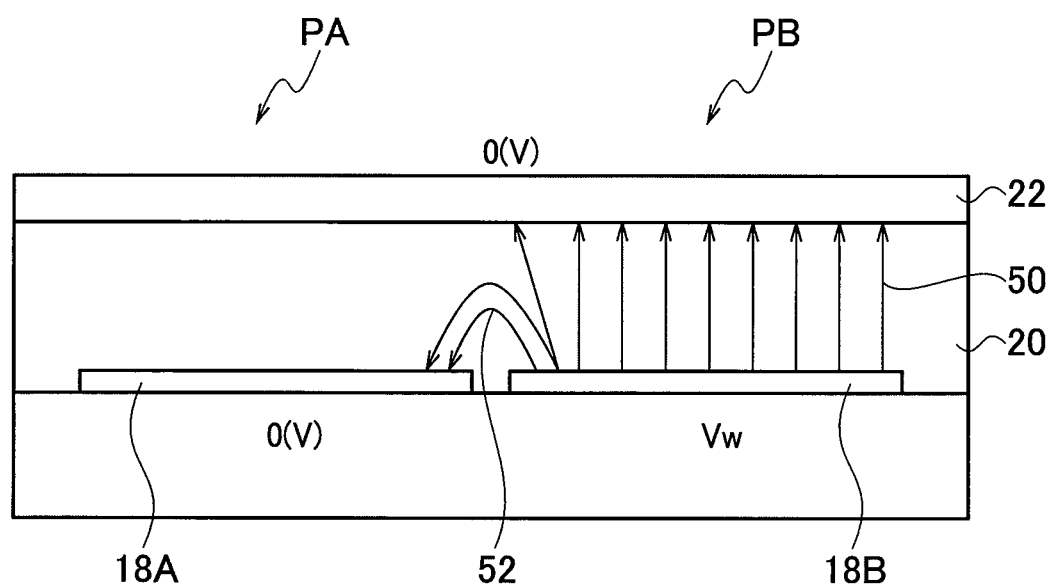
FIG. 12 is a view illustrating the case where drive states are different from each other in adjacent pixels.

In the case of a digital drive, it is often that the drive state (on/off of the applied voltage) differs between adjacent pixels. FIG. 12 illustrates the case where, in a pixel PA and a pixel PB which are adjacent to each other, the pixel PA is in a non-drive state and the pixel PB is in a drive state. That is, a potential of a pixel electrode 18A of the pixel PA is 0 (V), a potential of a pixel electrode 18B of the pixel PB is Vw (V), and a potential of a common electrode 10 is 0 (V).

At this time, an electric field 50 occurs in response to a potential difference between the pixel electrode 18B of the pixel PB and the counter electrode 22. Moreover, a potential difference also occurs between the pixel electrode 18A of the pixel PA and the pixel electrode 18B of the pixel PB, and an electric field 52 occurs in a lateral direction. Such a lateral electric field 52 causes unintended confusion in the motions of the liquid crystal 20 between the pixels, and becomes a factor of degradation in image quality. It is already known that the degradation in image quality owing to the lateral electric field 52 often occurs when only one of a certain pixel and a pixel adjacent thereto turns to the drive state from when both thereof are in the non-drive state, and is less likely to occur when only one thereof turns to the non-drive state from when both of the pixels are in the drive state. Such a degradation phenomenon of the image quality owing to the lateral electric field 52 is referred to as disclination.

An occurrence of the disclination is compared between the case of using the drive gradation tables of Comparative examples 1 and 2, which are illustrated in FIG. 10A and FIG. 10B, and the case of using the drive gradation table of one or more embodiments, which is illustrated in FIG. 5.

It is assumed that gradations of adjacent pixels are different from each other in the case of using the drive gradation table of Comparative example 2 in FIG. 10B, for example, that the gradations of the adjacent pixels are 5 and 6. At this time, both of the pixels are in the non-drive state until the subframe 6 (SF6), and only the pixel with the gradation of 6 turns to the drive state in the subframe 7 (SF7). In this case, only one of the adjacent pixels shifts to the drive state from a state where both of the adjacent pixels are in the non-drive state, and accordingly, a large amount of the disclination occurs. As described above, in the drive gradation table of Comparative example 2, the disclination is apt to occur when pixel values of the adjacent pixels are different from each other.

Next, it is assumed that the drive gradation table of Comparative example 1 in FIG. 10A is used. When the drive gradation table of Comparative example 1 is used, there is no situation under which only one of the adjacent pixels turns to the drive state from a state where both of the adjacent pixels are in the non-drive state, except for the case where the gradation of one of the adjacent pixels is 0. For example, it is assumed that the gradations of the adjacent pixels are 5 and 6. At this time, both of the pixels are in the drive state until the subframe 5 (SF5), and only the pixel with the gradation of 5 turns to the non-drive state in the subframe 6 (SF6). In this case, a change is made from the drive state of both of the pixels to the non-drive state of one thereof, and accordingly, the disclination is less likely to occur.

When the drive gradation table of one or more embodiments in FIG. 5 is used, one of the adjacent pixels shifts to the non-drive state from the state where both of the adjacent pixels are in the drive state in a similar way to the case where the drive gradation table of Comparative example 1 is used when combinations of the gradations of the adjacent pixels are made from among 1 to 4, 5 to 8, and 9 to 12. Accordingly, the disclination is less likely to occur. In a normal video signal, pixel values of adjacent pixels thereof are often approximate to each other. Accordingly, in comparison with the case where the drive gradation table of Comparative example 2 is used, the occurrence of disclination is greatly suppressed when the drive gradation table of one or more embodiments is used.

As described above, by using the drive gradation table of one or more embodiments, both of the occurrence of crosstalk and the occurrence of disclination can be suppressed. Therefore, further improvement of the image quality can be achieved while reducing the occurrence of crosstalk.

Other Examples of Drive Gradation Table

FIG. 13A and FIG. 13B illustrate other examples of the drive gradation table. FIG. 13A illustrates an example of dividing twelve subframes into two subframe groups, and FIG. 13B illustrates an example of dividing twelve subframes into four subframe groups.

The drive gradation table for use in the video display device according to one or more inventions is configured as follows. The number of subframes turned to the drive state is increased each time the drive gradations are increased. When all of the subframes are divided into a plurality of subframe groups including a plurality of continuous subframes, as the gradations are increased, subframes turned to the drive state are increased in order from the latest subframe group to the earliest subframe group among the plurality of subframe groups. In the subframe group, the subframes turned to the drive state are increased in order from the earlier subframe to the later subframe.

An increase of the number of divisions of the subframe groups is advantageous to suppression of the crosstalk, and a decrease of the number of divisions is advantageous to suppression of the disclination. The number of divisions only needs to be set arbitrarily while observing the image quality.

The present invention is not limited to the above-described one or more embodiments, and a variety of modifications can be made without departing from the scope of the present invention.

What is claimed is:

1. A video display device comprising:
  a subframe data generator configured to convert video data with N+1 gradations into subframe data with N bits based on a drive gradation table, where N is a natural number;

a display element; and a drive circuit configured to drive the display element based on the subframe data, wherein the drive gradation table is configured such that a number of subframes turned to a drive state is increased each time drive gradations are increased, when all of the subframes are divided into a plurality of subframe groups including a plurality of continuous subframes, as gradations are increased, subframes turned to the drive state are increased in order from a latest subframe group to an earliest subframe group among the plurality of subframe groups, and in each of the subframe groups, the subframes turned to the drive state are increased in order from the earlier subframe to the later subframe.

2. A video display method comprising:

converting video data with N+1 gradations into subframe data with N bits based on a drive gradation table, where N is a natural number; and driving a display element based on the subframe data, wherein the drive gradation table is configured such that a number of subframes turned to a drive state is increased each time drive gradations are increased, when all of the subframes are divided into a plurality of subframe groups including a plurality of continuous subframes, as gradations are increased, subframes turned to the drive state are increased in order from a latest subframe group to an earliest subframe group among the plurality of subframe groups, and in each of the subframe groups, the subframes turned to the drive state are increased in order from the earlier subframe to the later subframe.

* * * * *